United States Patent [19]
Johnston

[11] Patent Number: 4,782,459
[45] Date of Patent: Nov. 1, 1988

[54] ADAPTIVE RECOGNIZING DEVICE

[75] Inventor: Robert D. Johnston, Woodbridge, England

[73] Assignee: British Telecommunications, plc, London, England

[21] Appl. No.: 790,931

[22] Filed: Oct. 24, 1985

[30] Foreign Application Priority Data

Oct. 26, 1984 [GB] United Kingdom ............... 8427165

[51] Int. Cl.⁴ ........................... G06F 7/38; H04B 3/00
[52] U.S. Cl. ............................... 364/724.19; 379/411
[58] Field of Search ...................... 364/724, 728, 748;
367/43–46; 375/96, 103; 379/410–411;
370/32.1

[56] References Cited

U.S. PATENT DOCUMENTS

| | | | |
|---|---|---|---|
| 3,777,130 | 12/1973 | Croisier et al. ..................... | 364/724 |
| 4,405,840 | 9/1983 | Zebo .................................. | 379/411 |
| 4,425,483 | 1/1984 | Lee et al. .......................... | 379/411 |
| 4,435,823 | 3/1984 | Davis et al. ....................... | 364/724 X |
| 4,484,299 | 11/1984 | Lambourn et al. ................. | 364/724 |
| 4,535,206 | 8/1985 | Falconer ............................ | 379/410 |
| 4,578,544 | 3/1986 | Colin de Verdiere et al. ..... | 379/410 |
| 4,581,492 | 4/1986 | Virdee ............................... | 370/32.1 |
| 4,669,116 | 5/1987 | Agazzi et al. ..................... | 379/411 |
| 4,694,451 | 9/1987 | Adams et al. ..................... | 364/724 X |

FOREIGN PATENT DOCUMENTS

| | | |
|---|---|---|
| 098000 | 1/1984 | European Pat. Off. . |
| 58-223928 | 11/1983 | Japan . |
| 2007946 | 5/1979 | United Kingdom . |
| 2095067 | 9/1982 | United Kingdom . |

OTHER PUBLICATIONS

"A New Hardware Realization of Digital Filters," Peled et al., IEEE Transactions on Acoustics, Speech, and Signal Processing, vol. 22, #6, Dec. 1974.
"An Algorithm for High-Speed Digital Filters," Little, IEEE Transactions on Computers, vol. 23, #5, May 1974.
"Digital Filter Structures Described by Distributed Arithmetic," Burrus, IEEE Transactions on Circuits and Systems, vol. 24, #12, Dec. 1977.
"A New Digital Echo Canceler for Two-Wire Subscriber Lines." Holte et al., IEEE Transactions on Communications, vol. 29, #11, Nov. 1981.
"Nonlinear Echo Cancellation of Data Signals," Agazzi et al., IEEE Transactions on Communications, vol. 30, #11, Nov. 1982.
"Non-Linear System Modelling: Concept and Application," Cowan et al., IEEE 1984.
"Applied Ideas: Versatile Digital Arithmetic Unit with Rams," Electronic Engineering, Jun. 1976.
"A Digital Transaction Unit for the Local Network," Gerwen et al., Phillips Research Labs Publication, Conf. on Communications Equipment, Apr. 1982.
Aleksander et al., "Guide to Pattern Recognition Using Random-Access Memories", Computers and Digital Techniques, Feb. 1979, vol. 2, No. 1.
Snijders, "Microprocessor Implementation of Data Modems", Philips Research Laboratories, Eindhoven, The Netherlands.
Tan et al., "Speed-Optimised Microprocessor Implementation of a Digital Filter". IEEE Proc. vol. 128, pt. E, No. 3, May 1981.

Primary Examiner—Gary V. Harkcom
Assistant Examiner—Long Thanh Nguyen
Attorney, Agent, or Firm—Nixon & Vanderhye

[57] ABSTRACT

An electronic adaptive recognizing device which includes an input store having a number of storage locations for receiving an input signal, and a number of addressable stores each having one or more address lines connected to a number of the input store locations in either a random way or one determined by the input signal. The contents of the input store specify addressable store locations at which words of at least one bit are stored. Structure is provided for deriving a common value based on the words stored at the specified addressable store locations and for calculating a corrected value based on a received value and the common value. An updated value is applied, dependent on the corrected value, to each of the specified addressable store locations so that the common value is adapted to changes in the dependence of the received value on the input signal and so that the device can output an appropriate corrected value for a given input signal.

35 Claims, 7 Drawing Sheets

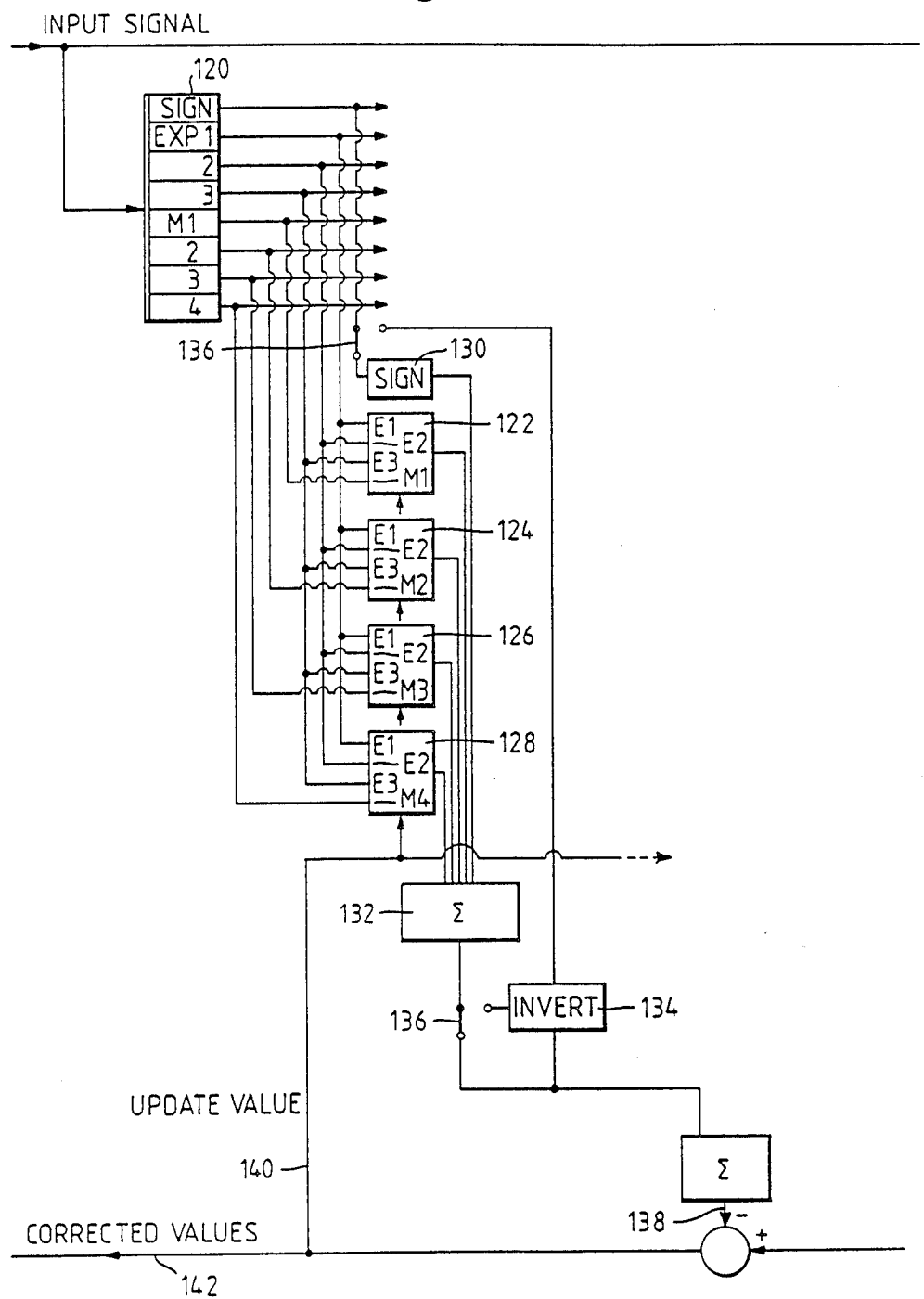

ADAPTIVE RECOGNIZING DEVICE

FIELD OF THE INVENTION

This invention relates to an adaptive recognising device. There are many technical fields in which electronic recognition processes are employed such as optical pattern or character recognition, voice recognition, and the like.

BACKGROUND OF THE INVENTION

In addition to such well known processes where values comprising labels are assigned to patterns of one form or another and output as responses by a recogniser, there are also many other processes in which patterns are recognised and values are output as responses. Two examples of such processes are for example echo cancellation and signal filtering, though hitherto such processes have not been considered as pattern recognition problems.

In all such processes though patterns are input, and a response is output and whilst the present invention is particularly suitable for use with recognition processes which also involve cancellation processes it may be adapted for other recognition processes where its properties may be used to advantage. In order to discuss the present invention more readily, particular reference will be made to the field of echo cancellation.

Echo cancellers are used in telephone circuits to suppress echoes received from a circuit by a station which emanate from signals transmitted into the circuit by the same station. Echoes result from a variety of causes for example slight mismatches in four to two wire hybrids and from accoustic feedback in the distant stations handset. Normally such echoes are not noticeable but with International calls, where the echo may be delayed by more than a few tens of milliseconds, they can be annoying. In order to maintain duplex operation an echo canceller is required which can model the response of any feedback path. Since different feedback paths and different hybrids will have different characteristics the canceller must be adaptive to be useful in any circuit.

Three main forms of filters/echo cancellers are known. In the first, known as an F.I.R. canceller (Finite Impulse Response), the input signal is convolved with the impulse response of the line to form an instantaneous echo estimate. In the UK the maximum echo delay encountered is about 32 ms and with an 8 kHz sampling rate a 256 tap shift register would be needed to hold the relevant history of the input signal whose echo is to be estimated. In order to estimate such an echo and update the response the canceller would need to perform 512 multiplications and 512 additions within the 125?s period between samples. To do this is expensive in terms of the high speed devices and fast memory required.

A second form of echo canceller uses the entire contents of the signal history shift register to address a large memory. Each possible previous form of the signal thus has a corresponding memory location and in each of these locations data is stored which comprises an estimate of the corresponding echo response for the particular signal history in the signal history shift register. However, if 8 bit words are used with the 240 tap shift register, which would be required as described above, the signal history shift register will have 1920 locations and thus the random access memory for storing the corresponding echo estimates will required $2^{1920}$ 8 bit word locations. Such an amount of memory is clearly impracticable to implement and the only practical cancellers of this type use a signal history shift register which is considerably smaller. The advantages of such a system are that no multiplications or additions are required and that since each input signal accesses a different memory location many non-linearities in the feedback path can be cancelled. However, the adaption times of such cancellers is long and in any event due to the constraints on memory size such cancellers are only practicable for use in systems where the number of transmitted symbols is small and the echo path short. Such systems are therefore unsuitable for speech signals.

A third form of echo canceller uses the contents of stages of an input shift register each containing a digital word of a signal to provide the addresses for a plurality of random access memories, each stage and thus word providing the address for a corresponding RAM. The contents of the RAM locations addressed thus are then summed to provide an echo estimate which can be updated. However such cancellers are only able to cope with amplitude dependant instantaneous non-linearities.

SUMMARY OF THE INVENTION

According to the present invention there is provided an electronic adaptive recognising device comprising, an input connected to an input store having a plurality of storage locations allowing data representative of elements of a signal pattern to be recognised to be stored at locations related to the positions of the elements in said pattern; a plurality of addressable stores each having one address line specifying one or more store locations therein, each of said addressable store locations being capable of containing a word of at least one bit, said address lines each being connected to a respective location in said input store such that the contents of said input store are capable of specifying a store location in each of said addressable stores; means for deriving a common value dependent on the contents of the store locations specified by the contents of said input store, an input for received values; an output for corrected values; calculating means for calculating a corrected value dependent on said common value and a corresponding one of said received values and updating means for applying an update value dependent on said corrected value to the contents of said specified store locations.

The present invention provides an adaptive recognising device which can enable implementation of devices, such as for example adaptive memory echo cancellers, without the need for excessive amounts of random access memory. The input store is preferably a shift register through which digital data forming a pattern is fed and the addressable stores are preferably each random access memories. In effect each of the addressable stores contributes to the common value which in turn contributes directly or indirectly to an estimate of the received value which in the case of an echo canceller will be the returned echo.

Since there is only one address line per addressable store the memory requirements are very small and the training time of the device will also be small. However, though such a system will not completely model non linearities in the input signal pattern if only one store location per addressable store is provided and though with two store locations per addressable store the capacity to model non-linearities is still limited, use of either one or two store locations per addressable store is still useful for the speed it gives and the economy of memory.

The means of deriving a common value dependent on the contents of the addressable store locations specified by the input store locations can take a number of suitable forms. Preferably though the common value is the sum of the contents of specified addressable store locations. Other functions than the sum may be used to derive the common value, though for each different function used an appropriate updating means for calculating the update value must be used to ensure that the device adapts correctly. The device is remarkable for its ability to recognise input data patterns and output corresponding reponses whilst using only a relatively small amount of memory and whilst also being able to very quickly adapt itself to account for changes in the received value's relationship to the input signal pattern which may be caused for example by a change in echo path in the case of an echo canceller. The device will also operate on any input of digital data which forms patterns in the input store whether the data represents data, a visual, aural, or any other pattern or mixture of them.

Preferably the corrected value is obtained by subtracting an estimate value from a corresponding one of the received values, the estimate value being derived from the average value of the contents of the store locations specified by the corresponding contents of the input store.

Alternatively the corrected value can be obtained by subtracting the sum from a corresponding one of the received values, providing the updating means comprises means for dividing the corrected value by the number of addressable stores connected to the input store in order to provide the update value. In both cases an update value is provided but in the former case both it and the partial estimates in the addressable store locations are each individual estimates whilst in the latter case they are true partial estimates requiring summing but not normalising or averaging before being supplied to the calculating means. In this latter case though, normalisation of the corrected value is required before it can be used as an update value. In both cases the update value is preferably added to each of the specified store locations in the addressable stores.

The addressable stores may each contain either one or two store locations which are addressed by the single address line for each store. If only one store location per store is provided the adaption time of the device is extremely quick but by using two store locations per store some of this speed may be sacrificed for an increased ability to model non-linearities.

The address line of each of the addressable stores may be connected to the input store locations in a number of different ways. The distribution of the locations may be determined by the use to which the device is to be put or the locations may be chosen at random. The use of random connections gives the ability to model non-linearities where the non-linearity cannot be defined.

In certain circumstances however it is advantageous to have more than one address line per addressable store and in this case the addressable stores each have a plurality of additional address lines which together with the single address line address a plurality of locations in said input store and are connected to locations in said input store at random. This arrangement will of course increase the adaption time of the device but it also enables the device to model many more different types of non-linearities and will be particulary useful if the form of the non-linearity to be modelled cannot be defined precisely.

When the addressable stores each have a plurality of additional address lines which together with the single address line address a plurality of store locations in the store then whether or not the locations of the address line connections are chosen randomly it is preferable that the number of address lines per addressable store is smaller than the number of bits each word of the input data is comprised of. This will result in a great saving of memory used by the addressable stores and can be effected with either a random distribution of the address lines or with a specific arrangement of them to suit a particular purpose.

In all the above embodiments of the present invention more than the one address line may advantageously be connected to a single input store location.

One particularly advantageous form of the present invention can be implemented when the input data comprises A-law or $\mu$ law words comprising a sign bit, three exponent bits and four mantissa bits. In such a case instead of the address lines for an addressable store being taken from one eight bit "vertical" segment of the input shift register the exponent bit, optionally the sign bit and one only each of the mantissa bits are fed to each of four addressable stores whose outputs are summed. The addition may be effected by either by a series of adders each of whose outputs are summed together by a common adder to provide a common value or by a single adder common to all the addressable stores of the device. In either case the sign bit may be fed to the same addressable stores as the other bits so that each addressable store has five address lines or it may be fed to a separate addressable store having two store locations whose outputs are summed in common with the outputs of the other addressable stores. Alternatively if the outputs of the four addressable stores are summed then the sign bit can be used to control an inverter acting on the output of each individual summing means. Such an arrangement can of course be used with any form of non linearly coded words involving exponent and mantissa bits if the input store comprises a register each stage of which contains one of said words and a plurality of the addressable stores are connected to each of a plurality of the input store stages and are addressed by at least all said the exponent bits and one of said mantissa bits the outputs of all the addressable stores being summed as before to provide a total estimate.

Instead of using a single recognising device a plurality of them may be combined by having their input stores connected in series and having a common input, input for received values, output for corrected values, calculating means and updating means. The estimate value used in the calculating means in this case is the average of the average values of the contents of the addressable store locations specified by the contents of each of the input stores.

A device according to the present invention may also include means for selectively operating the device according to a predetermined sequence in either a recognition mode in which corrected values are output or in an update mode where the update value is applied, preferably by being added, to the contents of each of said addressable store locations by the update means.

The device according to the present invention may be made capable of recognising data forming a particular input signal pattern independently of the pattern's position in a shift register forming the input store by writing identical values in locations corresponding to a plurality of positions of said signal pattern in the input store shift register.

The device may of course be used as an echo canceller for use with a transmitter/receiver unit when the transmitter output is applied to the device input, the receiver is connected to the output for corrected values and the input for received values is supplied with a signal including an echo which is to be received by the receiver. This enables portions of the received signal which are derived from the transmitted signal to be cancelled.

The device may also be used as a self training filter or waveform recogniser by connecting the input to the input for received values and providing means for interrupting the updating of the contents of the addressable store locations. Using the device in this way enables the device to be trained to recognise a particular input signal pattern or patterns by passing the appropriate signal patterns into the input. After updating is interrupted the corrected value output will only be cancelled for those input signal patterns on which the device has been trained.

BRIEF DESCRIPTION OF THE DRAWINGS

Preferred embodiments of the present invention will now be described with reference to the accompanying drawings in which:

FIG. 9 shows a partial view in diagrammatic form of another embodiment of the present invention being used as an echo canceller in a telephone circuit using A-law or $\mu$ law words.

DETAILED DESCRIPTION

Figure 1:
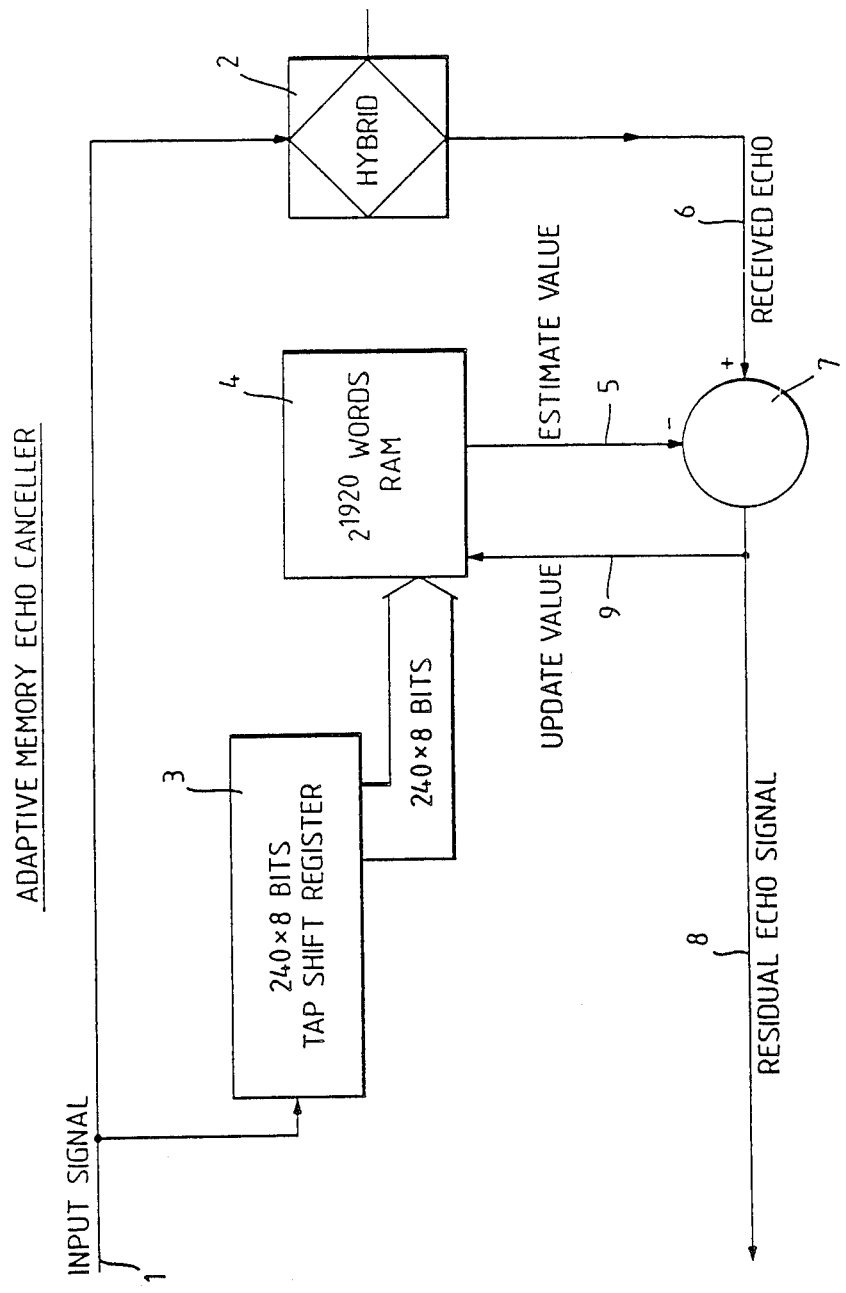
FIG. 1 shows an hypothetical adaptive memory echo canceller according to the prior art in diagrammatic form.

In FIG. 1 an adaptive memory echo canceller according to the prior art is shown. An input signal 1 which is also to be transmitted from a hybrid 2 is fed into a 240×8 bit shift register 3. Once the shift register 3 contains a sequence of words it also in effect contains a pattern of binary values. Each of the cells of the shift register thus contains either 0 or 1 and each of these cells is also connected to an address line of a block 4 of random access memory (RAM). Since the shift register 3 contains 1920 cells the RAM will have to have $2^{1920}$ words of memory in order to store an echo estimate for each of the possible input signal bit patterns in the shift register 3. Assuming such a memory could be constructed the addresses in the RAM 4 can be used to store echo estimates which can be read out as an estimate value 5 when the corresponding signal pattern is detected by the address lines connected to the shift register. The echo estimate value 5 corresponding to the input signal 1 is then subtracted 7 from the actual echo 6 received from the hybrid 2 to provide a residual echo signal 8. The residual echo signal 8 is used to send an update value 9 to the RAM location where the estimate value 5 came from so that when exactly the same signal appears again the corrected echo estimate will be read out.

The major disadvantage with such system is that an impossibly large amount of memory is required. Such echo cancellers can thus only be used where the echo path is short and the number of transmitted symbols small which considerably limits their usefulness. A further disadvantage of such a large memory requirement is that the training time taken before a response for each of the types of signal likely to be encountered in normal operation has been stored is very great.

Figure 2:
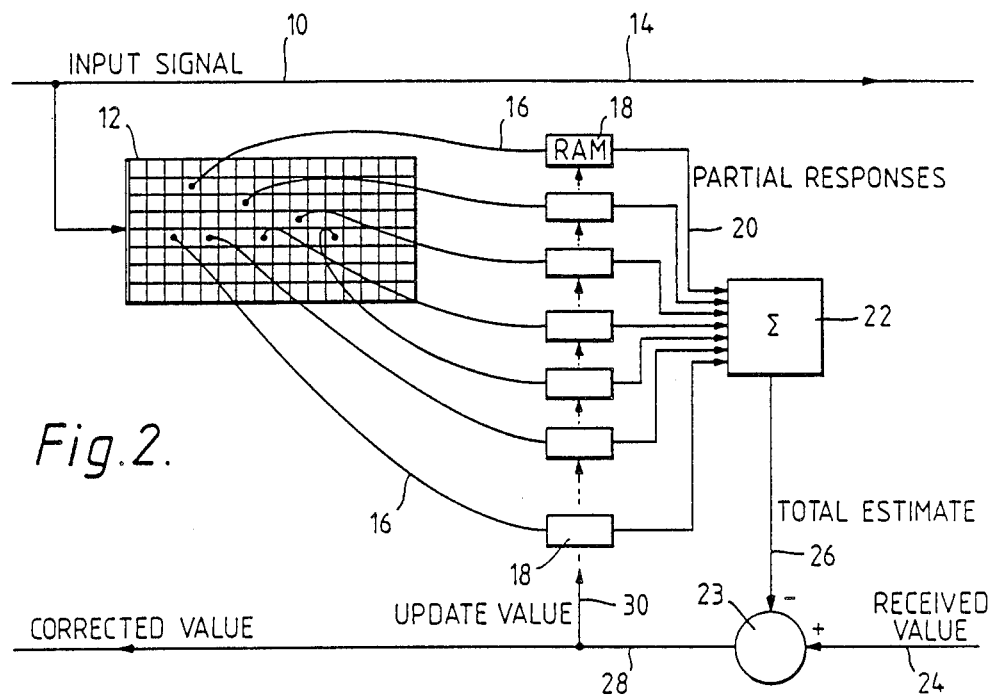
FIG. 2 shows in diagrammatic form an adaptive recognising device according to an embodiment of the present invention.

FIG. 2 shows a general embodiment of the present invention in diagrammatic form. The use of the circuit is not restricted to use as an echo canceller but may be put to a number of uses. An input signal 10 is fed into an input store 12 which is preferably a shift register. The manner in which the data is fed in will depend on its source and the use to which the device is being put and is not important provided the result is an array of cells each containing bits of the input data. The input signal may, if preferred, be fed through the shift register 12 as part of a line 14 rather than being tapped from it.

Linked to individual cells of the input store 12 are a plurality of address lines 16. Each of these lines senses the contents of a particular input store cell and each forms the address line for a respective random access memory 18 (of which only a representative few are shown). Since there is only one address line per RAM each RAM only contains either one or two address. Thus the size of RAM required is considerably reduced compared to the prior art whilst the number input store cells remains the same. For example in FIG. 2 128 input store cells are shown which using the construction of FIG. 1 would require a RAM with $2^{128}$ addresses. Using the construction of FIG. 2 RAMs with only $2^1$ addresses are required and whilst more than one of these is used the total memory requirement is still considerably reduced.

The address lines 16 may be connected to the input store cells in any suitable way either according to a predetermined pattern depending on the use to which the device is put or randomly as shown in FIG. 2. The connections of different lines may also be to identical cells. The number of lines 16 and thus the number of RAMs 18 may take any suitable number, typically this might be such that there are as many address lines as input store cells but a lesser or greater number may be used.

The address lines 16 each specify an address in a corresponding RAM 18 corresponding to the contents of the input store 12 and the location of the address lines 16 among the store cells. At each of the RAM store locations a word is stored indicating a partial response to the input store contents.

A common value based on these partial responses is then calculated by an appropriate device 22. The way in which the common value is derived from the partial responses may take a number of suitable forms but is preferably by addition of all the partial responses. A calculating means 23 then calculates a corrected value 28 based on the common value forming a total estimate 26 and also on a received value 24 which is related in some way to the input signal 10. An updating means (not shown) then applies an update value 30 to each of the RAMs 18 so that the next time the same data is present in the input store a substantially correct total estimate will be returned. The updating means also allows variations in the dependence of the received value on the input signal to be accounted for by amending the partial responses 20 when the received value 24 differs from that expected based on the input signal 10 and the partial responses corresponding to it which are already stored in the RAMs 18. The way in which the updating means calculates the update value 30 must be appropriate though to the way in which the device 22 derives the common value so that the device will adapt correctly.

Preferably the partial responses 20 are summed by summing means 22 and the total 26 subtracted 23 from the received value 24 of which the total estimate 26 is an estimate. The subtraction 23 yields the corrected value 28 which is also used to provide the update value 30 for the RAM address locations which provided the partial responses 20. Since the words held in the RAM addresses are summed by the summing means 22 either the total estimate 26 or the corrected value 28 must be divided by the total number of RAMs 18 used to prevent a wrongly scaled update value 30 being applied to the RAM addresses to be updated. Preferably the update value is added to the contents of each address to be updated. Other means for deriving an update value may be used as appropriate though, for example a fraction of the error may be returned or only a sign bit. In such cases adaption will be slower though.

By connecting directly or indirectly the line 14 to the received value input 24 a particularly useful set of uses of the device can be realised. The device will, when a signal 10 is input to it, learn to recognise the signal and return a total estimate which will be the same or nearly the same as the received value 24 corresponding to the input signal 10. Subsequent variations in the relationship between the input signal and received value will be adjusted for by the device due to the adaptive nature of the device. Furthermore faults in the device for example in one of the blocks of RAM will be adjusted for by the device too since the other RAMs will compensate for the error when they are updated.

By interrupting the updating of the RAM after learning has occurred the device can be used to recognise only those signals on which it has been trained and if the total estimate value for all other signals is made zero the corrected value 28 will only be other than the received value 24 for those input signals 10 comprising signals on which the device has been trained. The device can thus be in effect as a trainable filter or input signal pattern detector.

A further advantage of the system is that no multiplications are necessary. When used as an echo canceller this gives the device a definite advantage over F.I.R. cancellers which have to perform many such calculations.

The device also has the advantage of being able to associate a value comprising a plurality of bits with a particular response for each of the RAMs.

The use of RAMs having only one or two addresses gives a great saving in memory requirement in comparison with prior art devices.

Figure 3:
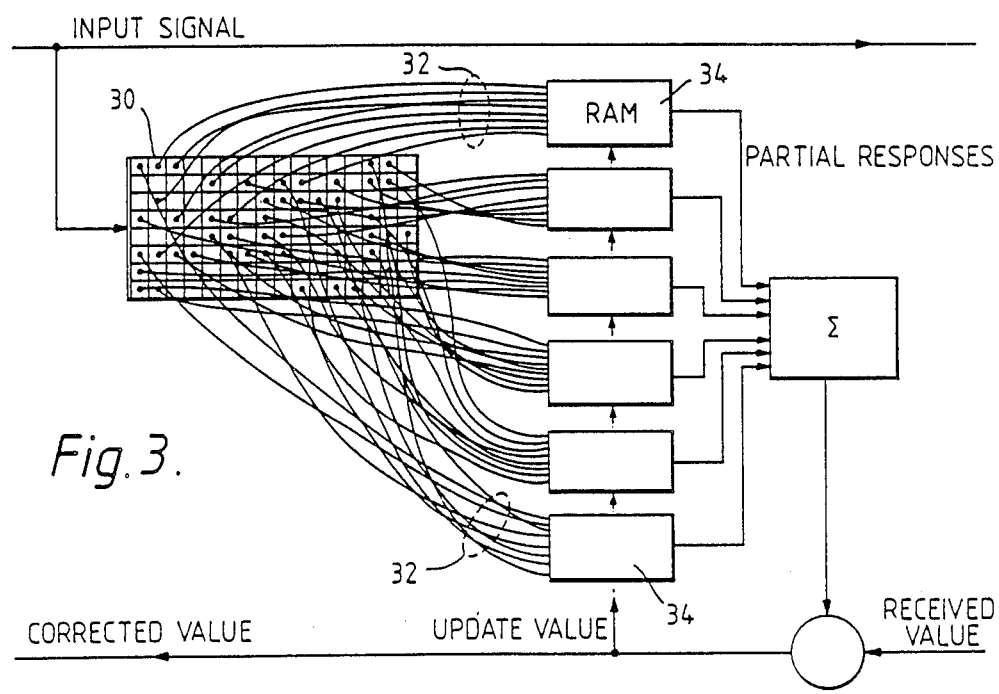
FIG. 3 shows in diagrammatic form an adaptive recognising device according to a further embodiment of the present invention using a plurality of randomly distributed address lines for each addressable store.

FIG. 3 shows a further embodiment of the present invention in diagrammatic form. In this embodiment each RAM is provided with additional memory locations and additional address lines the latter of which are distributed randomly over the input store. Linked to individual cells of the input store 30 are a plurality of address lines arranged in groups 32. Each of these lines senses the contents of a particular input store cell and each group of lines forms the address lines for a respective block of RAM 34. The groups of lines may be of any size from 1 upwards. Preferably though the number is kept relatively small so that the number of addresses per block of RAM which can be addressed is kept within practical limits. Since the number of lines per RAM may typically be only 8 the number of addresses per RAM will only be $2^8$. Thus the size of RAM required is also considerably reduced compared to the prior art whilst the number of input store cells remains the same. For example in FIG. 3 128 input store cells are shown which using the construction of FIG. 1 would require a RAM with $2^{128}$ addresses. Using the construction of FIG. 2 RAMs with only $2^8$ addresses are required and whilst more than one of these is used the total memory requirement is still considerably reduced. At the same time the random distribution of the address lines enables the modelling of many different waveforms and particularly non-linearities which prior art devices could not.

The connections of different lines may also be to identical cells. The number of such groups of lines 32 and thus the number of RAMs 34 may take any suitable member, typically this might be such that there are as many address lines as input store cells but a lesser or greater number may be used.

The groups of address lines 32 each specify an address in a corresponding RAM 34 corresponding to the contents of the input store 30 and the location of the address lines 32 among the store cells. At each of the RAM store locations a word is stored indicating a partial response to the input store contents. These partial responses are summed to produce a total estimate which in conjunction with a received value is used to produce a corrected value and an update value in the same way as is shown in FIG. 2.

Figure 4:
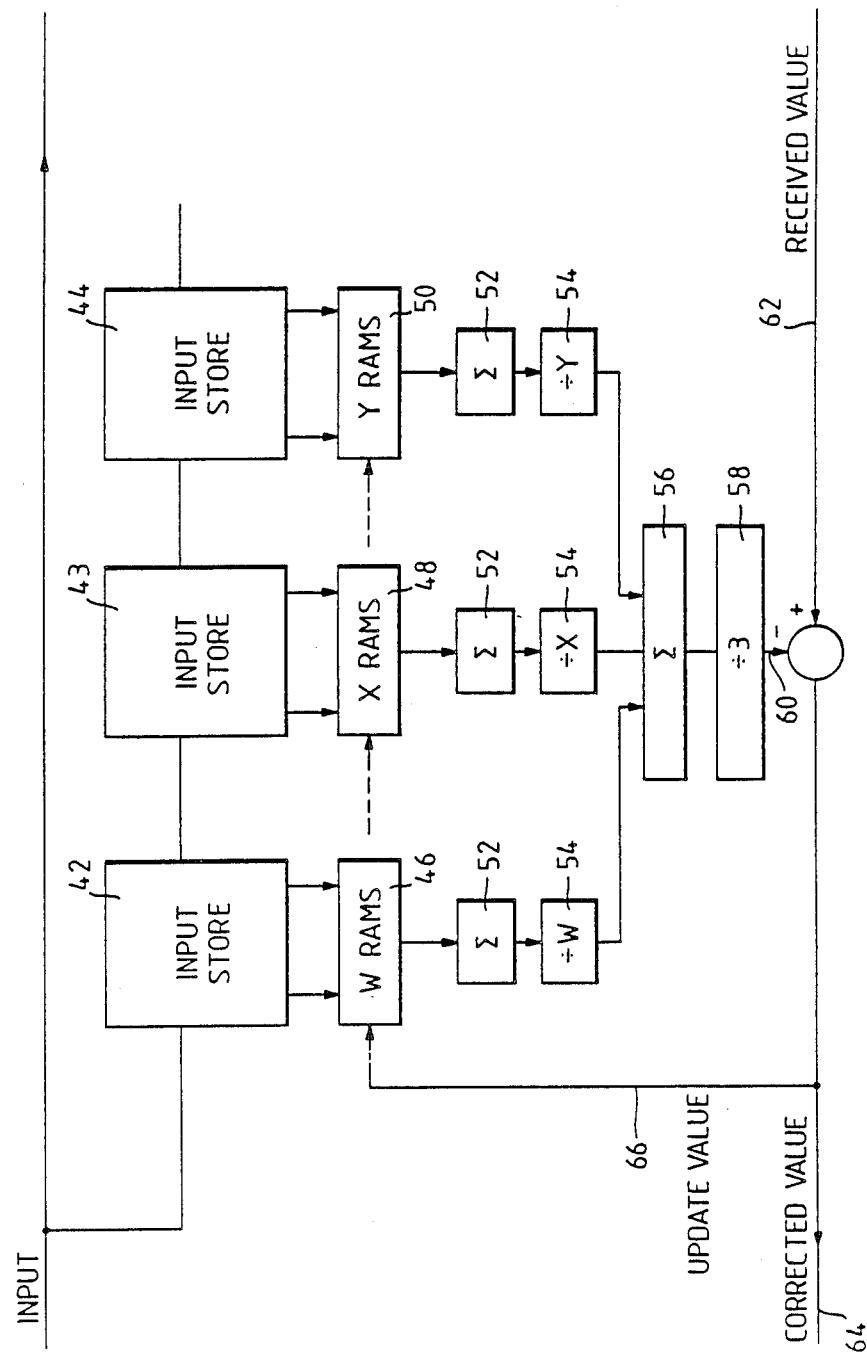
FIG. 4 shows in diagrammatic form an adaptive recognising device according to a further embodiment of the present invention using a plurality of input stores.

The use of a larger number of address lines increases the devices ability to model non-linearities but at the same time increases the memory requirement. In FIG. 4 a further embodiment of the device according to the present invention is shown which comprises a plurality of input stores connected in series 42, 43, 44. These are each connected to a plurality of corresponding series of RAMs 46, 48, 50 by a plurality of address lines in a similar manner to those 16, 32 shown in either FIGS. 2 or 3. Each of the RAMs in the series of RAMs 46, 48, 50 output a stored partial estimate in response to the address generated by the contents of its appropriate input store. For each of the series of RAMs 46, 48, 50 the partial responses are summed by summing means 52, divided 54 by the number of RAMs in the respective series to produce an average estimate value for each of the series of RAMs. The average values are then summed in summing means 56 and divided 58 by the number of series of RAM to produce an average of the average values as an estimate value 60. The estimate value obtained in this way is then used together with a received value 62 to produce a corrected value 64 from which is derived an update value 66 for application to the RAMs 46, 48, 50 in a similar manner to the update value in FIGS. 2 or 3. In this manner a global error update value is applied to the RAMs used.

Figure 5:
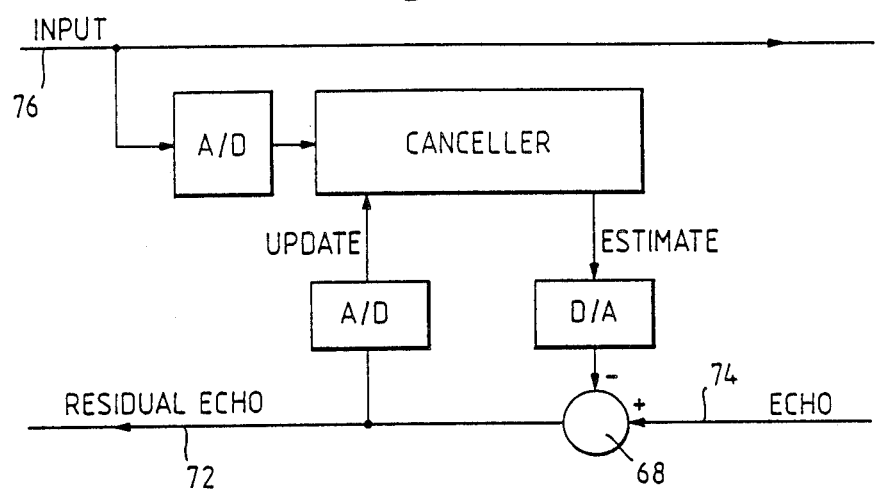
FIGS. 5 and 6 show in diagrammatic form two arrangements of analogue to digital and digitial to analogue converters for use with the device shown in FIGS. 2 to 4 as an echo-canceller in an analogue circuit.
Figure 6:
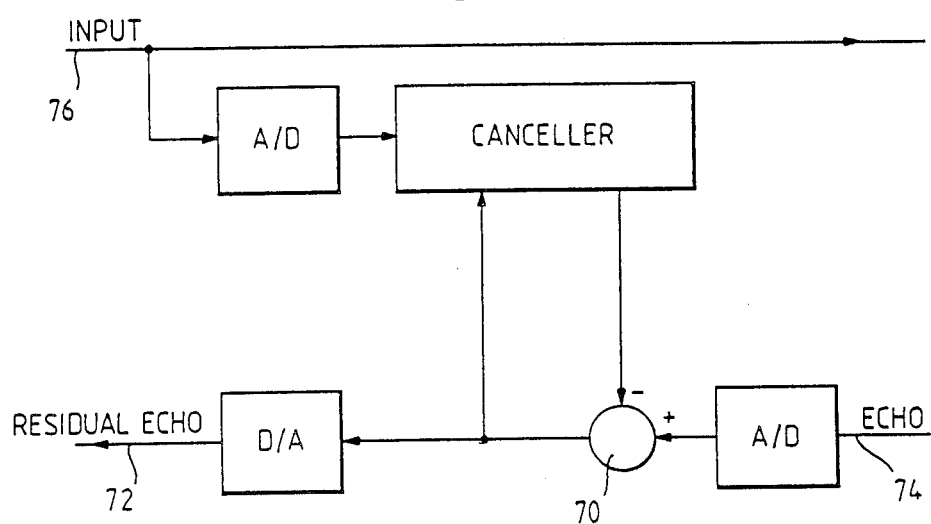

In FIGS. 5 and 6 diagrammatic views of the disposition of analogue to digital (A/D) and digital to analogue (D/A) converters are shown for use of the circuits shown in FIGS. 2, 3 or 4 as echo cancellers using linearly coded input signals. In FIG. 5 the subtraction of the estimate signal from the echo signal is performed by an analogue subtractor 68 whereas in FIG. 6 the subtraction is performed by a digital subtractor 70. In each case the corrected value forms the echo cancelled signal 72, the echo forms the received value 74, and the transmitted signal forms the input signal 76. However, the configuration shown in FIG. 5 is preferred due to the delays caused to updating by the configuration shown in FIG. 5 in certain circumstances.

Figure 7:
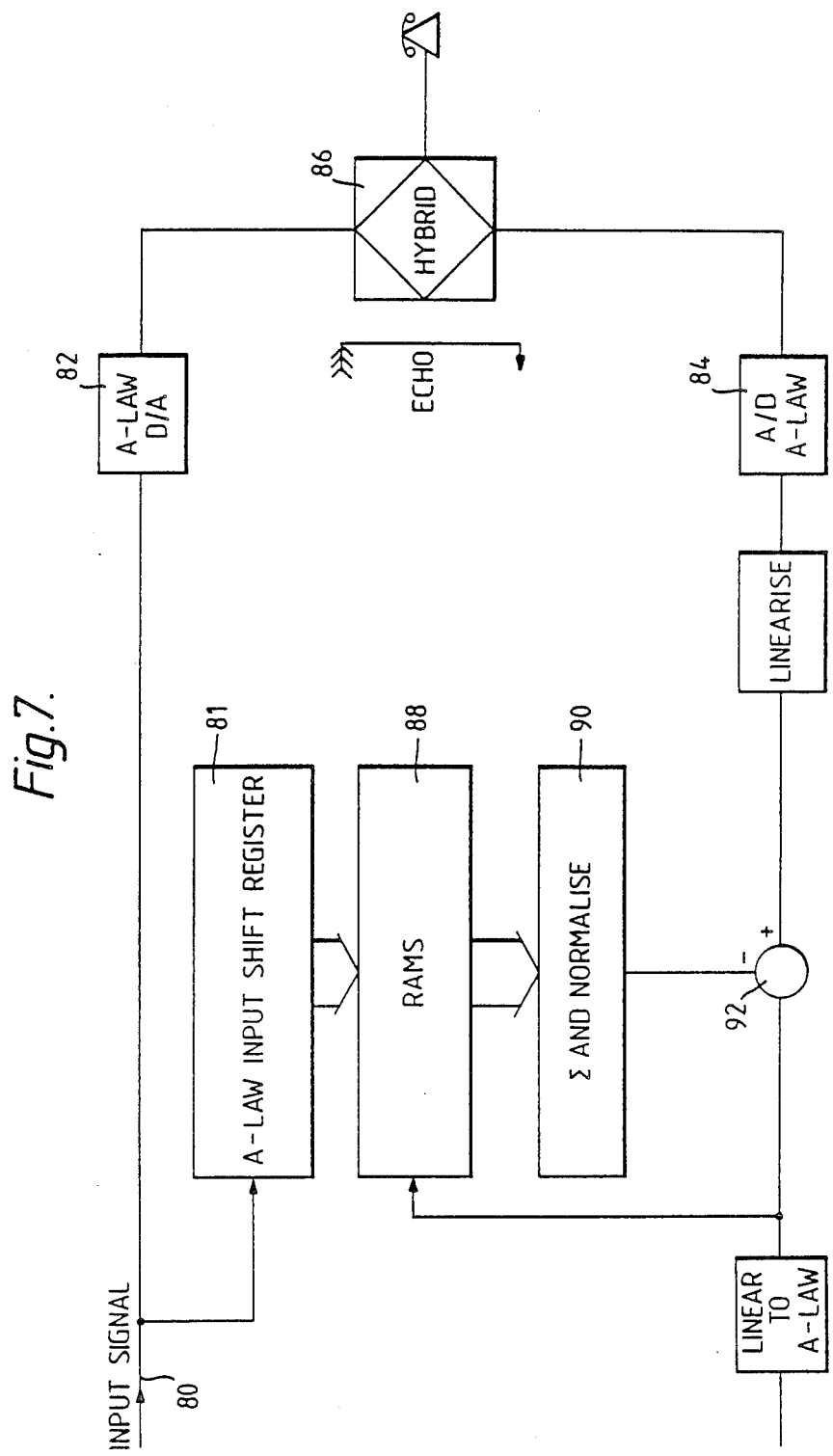
FIG. 7 shows in diagrammatic form an embodiment of the present invention being used as an echo canceller in a telephone circuit using A-law words showing where linearisation of the signal is required.

FIG. 7 shows in diagrammatic form an embodiment of the present invention being used as an echo canceller in a telephone circuit using A-law words showing where linearisation of the signal is required. The same need for linearisation arises when $\mu$ law word or any other non-linearly coded words are used. This is particularly relevant when the present invention is to be used in a telephone circuit where A-law or $\mu$ low words are being used. In FIG. 7 the input signal 80 is fed to an input shift register 81. Conventional A/D and D/A converters 82, 84 connected to a hybrid 86 are provided. However, since the digital words being input to the echo canceller are non-linearly coded it is necessary to surround the estimate subtractor 92 (which may form part of the device as shown in either of FIGS. 2, 3 or 4) with linearisers for converting coded words to linear words and vice versa so that the subtraction of the estimate value from the received value can be performed on linearly coded values. However, with the present invention there is no need for the input to the input shift register to be linearised since a device according to the present invention will "recognise" the input irrespective of its coding and produce an appropriate linear estimate.

Using an arrangement as shown in FIG. 7 in conjunction with the arrangements shown in FIGS. 2, 3 or 4 enables non-linearly coded input signals to be used without the need for a lineariser on the input to the input shift register unlike many prior art echo-cancellers which do need a preliminary linearisation step before any cancellation can occur. However it is possible to use a vertical arrangement of the RAM address lines which uses fewer address lines per RAM than there are bits in the words of the input signal and yet still achieves as good a result as if for example eight address lines per RAM were used when dealing with A law or $\mu$ law coded words. One such arrangement is shown in FIG. 8.

Figure 8:
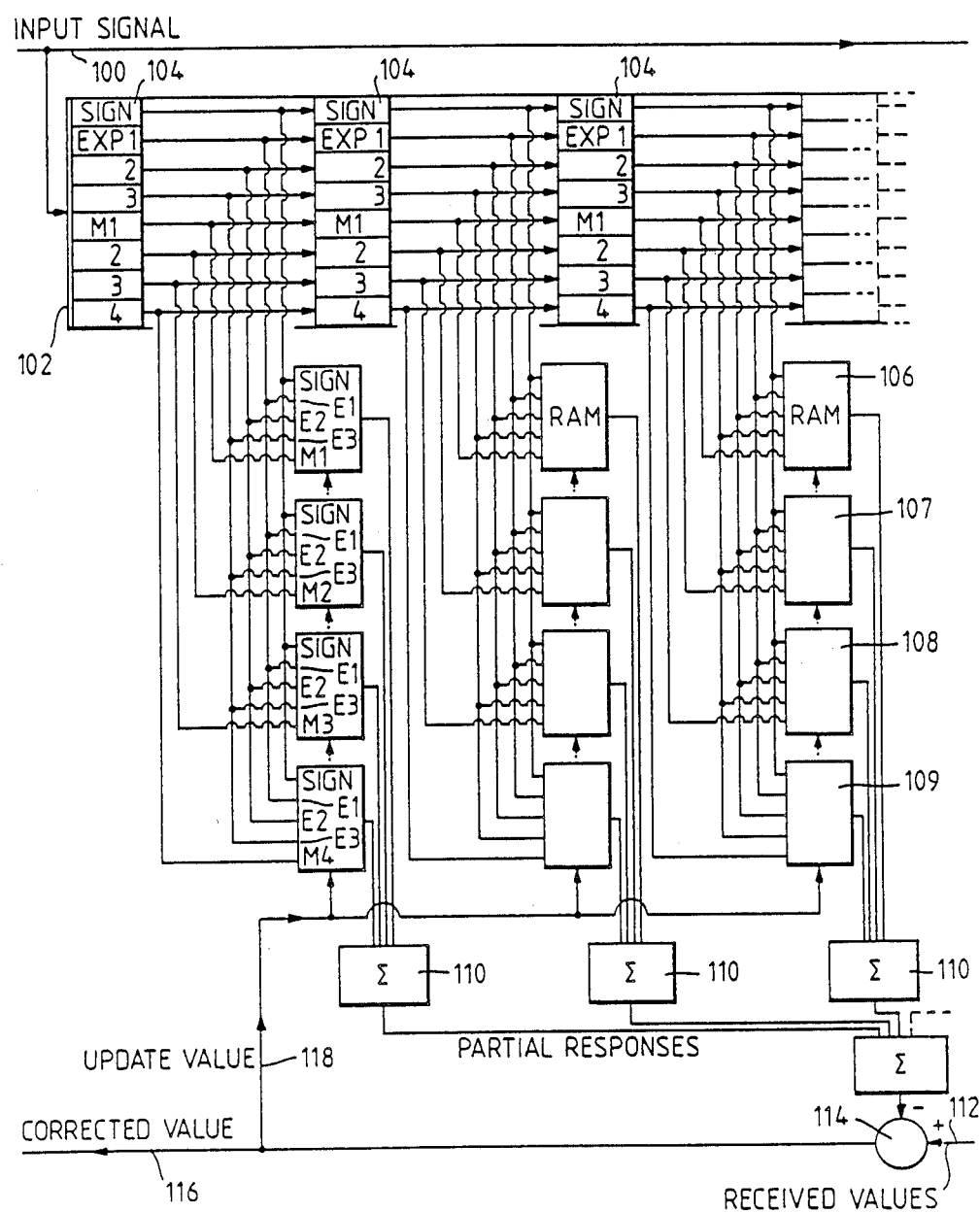
FIG. 8 shows a partial view in diagrammatic form of a further embodiment of the present invention being used as an echo canceller in a telephone circuit using A-law or $\mu$ law words.

In FIG. 8 an input A or $\mu$ law coded signal is fed not only to a hybrid (not shown) but also to an input shift register 102. For the sake of clarity only four stages of the shift register are shown but any suitable number may be used as with the arrangements shown in FIGS. 2 or 3. Each stage 104 of the shift register 102 comprises eight cells, one for a sign bit, three for exponent bits and four for mantissa bits. The shift register thus comprises an eight bit parallel shift register. Four RAMs 106, 107, 108, 109 are connected to each of the stages 104 by only five address lines each. In the case of each RAM four of the address lines are taken from the cells containing the sign bit and the three exponent bits in each stage. The fifth address line in the case of each RAM is taken from one of the mantissa cells of the corresponding stage. The values of the locations in each RAM specified by the word in the stage are summed for each set of four RAMs corresponding to a stage in the shift register by adders 110 to form partial reponses. These are in turn summed to form a total estimate. The individual adders 110 may alternatively be dispensed with and the outputs from each RAM summed together directly. In either case the total estimate is then subtracted from a received value 112 by a subtractor 114 to give a corrected value 116 and an update value 118 in the same manner as that shown in FIGS. 2, 3 or 4. Suitable normalising means should of course be used to ensure that the correct update value is applied to the RAM locations. One of the main advantages of this arrangment is the saving in memory it gives in comparison with using one eight address line RAM per shift register stage. For a sixteen stage shift register such an arrangement would require sixteen $2^8$ address RAMs where as using an arrangement as shown in FIG. 8 would only require sixty four $2^5$ address RAMs, a saving of 2048 bits of memory. Despite this reduction in memory the device is still able to function and has a greater adaption speed than one having the larger memory requirement.

In FIG. 9 a further variant of the arrangement shown in FIG. 8 is shown. For the sake of clarity only one of the shift register stages 120 is shown the others and their associated RAMs being identical. In this case there are five RAMs per shift register stage. Four are four address line RAMs 122, 124, 126, 128. The other is a two address RAM 130 whose single address line is supplied by the sign bit cell of the associated shift register stage. The four address lines for each of the other RAMs are taken from the three exponent bit cells and one of the four mantissa bit cells in each case. The outputs from all five RAMs are summed by an adder 132 there being one such adder per shift register stage. Alternatively the outputs from each RAM may be summed directly. A further alternative arrangement is for the two address sign bit RAM to be omitted altogether and the sign bit used to control an inverter 134 on the output of the corresponding adder 132. Both arrangements can be incorporated in the same device by use of a suitable switch 136. Once the total estimate 138 has been obtained it is subtracted from the received values to give an update value 140 and a corrected value 142 in the same way as with the arrangements shown in FIGS. 2, 3, 4 or 8.

Such an arrangement gives an even greater saving in memory since it only requires sixty four $2^4$ address RAMs with an optical two address RAM for the sign bit.

I claim:

1. An electronic adaptive recognizing device comprising:
    a device input;
    an input store, connected to said device input, having
        a plurality of storage locations allowing data representative of elements of a signal pattern to be recognized to be stored at locations related to the positions of the elements in said pattern;

a plurality of addressable stores each having only one address line specifying one or more store locations therein, each of said addressable store locations being capable of containing a word of at least one bit, said address lines each being connected to a respective location in said input store such that the contents of said input store are capable of specifying a store location in each of said addressable stores;

means for deriving a common value dependent on the contents of the store locations specified by the contents of said input store;

means for receiving values related to said signal pattern;

calculating means for calculating a corrected value dependent on said common value and a corresponding one of said received values;

an output coupled to said calculating means for outputting said corrected values; and updating means for applying an update value dependent on said corrected value to the contents of said specified store locations.

2. A recognizing device according to claim 1 wherein said means for deriving determines said common value by taking the sum of the contents of the store locations specified by the contents of said input store.

3. A recognizing device according to claim 2 wherein said calculating means comprises means for obtaining said corrected value by subtracting an estimate value from a corresponding one of said received values and averaging means for deriving said estimate value from the average value of the contents of the store locations specified by the corresponding contents of said input store.

4. A recognizing device according to claim 2 wherein said calculating means comprises means for obtaining said corrected value by subtracting said sum from a corresponding one of said received values and said updating means comprises means for dividing said corrected value by the number of said addressable stores connected to said input store to provide said update value.

5. A recognizing device according to any one of the preceding claims wherein said updating means adds said update value to the contents of each of said specified store locations.

6. A recognizing device according to any one of claims 1 to 4 wherein said addressable stores each contain only one store location.

7. A recognizing device according to any one of claims 1 to 4 wherein said addressable stores each contain only two store locations.

8. A recognizing device according to any one of claims 1 to 4 wherein said address lines are connected to locations in said input store at random.

9. A recognizing device according to any one of claims 1 to 4 wherein more than one address line are connected to a single input store location.

10. A recognizing device according to claim 3 comprising a plurality of input stores, said input stores being connected in series and having said device input as a common input, each of said plurality of input stores being coupled to a plurality of said addressable stores, and each of said input stores having a common means for receiving values, output for corrected values, calculating means and updating means, wherein said estimate value comprises the average of the average values of the contents of said addressable store locations specified by the contents of each of said input stores.

11. A recognizing device according to any one of claims 1 to 4 further comprising means for selectively operating said device according to a predetermined sequence in either a recognition or an updating mode wherein said recognition mode corrected values are output and in said update mode said updating means applies said update value to the contents of each of said addressable store locations.

12. A recognizing device according to any one of claims 1 to 4 wherein said input store comprises a shift register into which data forming a signal pattern to be recognized may be fed and said addressable stores have identical values written in locations corresponding to a plurality of positions of said signal pattern in said shift register such that said signal pattern may be subsequently recognized independently of its position in said input store.

13. A recognizing device according to any one of claims 1 to 4 including a transmitter/receiver unit wherein said transmitter output is also applied to said device input, said receiver is connected to said output for outputting corrected values and said means for receiving values is supplied with a signal to be received by said receiver, such that portions of said signal to be received by the receiver which are derived from signals transmitted by the transmitter are cancelled.

14. A recognizing device according to any one of claims 1 to 4, wherein said device input is coupled to a signal to be digitally filtered, and further including means for disabling said updating means after supplying the signal to be filtered to said input, said device input also being connected to said means for receiving values.

15. An electronic adaptive recognizing device comprising:

a device input;

an input store, connected to said device input, having a plurality of storage locations allowing data representative of elements of a signal pattern to be recognized to be stored at locations related to the positions of elements in said pattern;

a plurality of addressable stores each having address lines specifying one or more store locations therein, each of said addressable store locations being capable of containing a word of at least one bit, said address lines each being connected to a respective location in said input store such that the contents of said input store are capable of specifying a store location in each of said addressable stores, at least some of said address lines being connected to locations in said input store at random;

means for deriving a common value dependent on the contents of the store locations specified by the contents of said input store;

means for receiving values related to said signal pattern;

calculating means for calculating a corrected value dependent on said common value and a corresponding one of said received values;

an output coupled to said calculating means for outputting said corrected values; and updating means for applying an update value dependent on said corrected value to the contents of said specified store locations.

16. A recognizing device according to claim 15 wherein said means for deriving determines said common value by taking the sum of the contents of the store locations specified by the contents of said input store.

17. A recognizing device according to claim 16 wherein said calculating means comprises means for obtaining said corrected value by subtracting an estimate value from a corresponding one of said received values and averaging means for deriving said estimate value from the average value of the contents of the store locations specified by the corresponding contents of said put store.

18. A recognizing device according to claim 16 wherein said calculating means comprises means for obtaining said corrected value by subtracting said sum from a corresponding one of said received values and said updating means comprises means for dividing said corrected value by the number of said addressable stores connected to said input store to provide said update value.

19. A recognizing device according to any one of claims 15 to 18 wherein said updating means adds said update value to the contents of each of said specified store locations.

20. A recognizing device according to any one of claims 15 to 18 wherein the number of address lines per addressable store is smaller than the number of bits each word of said input data is comprised of.

21. A recognizing device according to any one of claims 15 to 18 wherein more than one address line are connected to a single input store location.

22. A recognizing device according to claim 17 comprising a plurality of input stores, said input stores being connected in series and having a common input and each of said plurality of input stores being coupled to a plurality of addressable stores, each of said input stores having a common means for receiving values, output for corrected values, calculating means and updating means, wherein said estimate value comprises the average of the average values of the contents of said addressable store locations specified by the contents of each of said input stores.

23. A recognizing device according to any one of claims 15 to 18 further comprising means for selectively operating said device according to a predetermined sequence in either a recognition or an updating mode wherein in said recognition mode corrected values are output and in said update mode said updating means applies said update value to the contents of each of said addressable store locations.

24. A recognizing device according to any one of claims 15 to 18 wherein said input store comprises a shift register into which data forming a signal pattern to be recognized may be fed and said addressable stores have identical values written in locations corresponding to a plurality of positions of said signal pattern in said shift register such that said signal pattern may be subsequently recognized independently of its position in said input store.

25. A recognizing device according to any one of claims 15 to 18 including a transmitter/receiver unit wherein said transmitter output is also applied to said device input, said receiver is connected to said output for outputting corrected values and said means for receiving values is supplied with a signal to be received by said receiver, such that portions of said signal to be received by the receiver which are derived from signals transmitted by the transmitter are cancelled.

26. A recognizing device according to any one of claims 15 to 18 wherein said device input is coupled to a signal to be digitally filtered, and further including means for disabling said updating means after supplying the signal to be filtered to said device input, said device input also being connected to said means for receiving values.

27. An electronic adaptive recognizing device comprising:
a device input;
an input store, connected to said device input, having a plurality of storage locations allowing data words representative of elements of a signal pattern to be recognized to be stored at locations related to the positions of the elements in said pattern;
a plurality of addressable stores each having a plurality of address lines specifying a plurality of store locations therein and wherein the number of address lines per addressable store is smaller than the number of bits each word of said input data is comprised of, each of said addressable store locations being capable of containing a word of at least one bit, said address lines each being connected to a respective location in said input store such that the contents of said input store are capable of specifying a store location in each of said addressable stores and wherein said input data words comprise non-linearly coded words having one or more exponent bits and one or more mantissa bits and said input store comprises a register, each stage of which contains one of said words and wherein a plurality of said addressable stores are connected to each of a plurality of said stages and are each addressed by at least all said exponent bits and one of said mantissa bits;
means for deriving a common value dependent on the contents of the store locations specified by the contents of said input store;
means for receiving values related to said signal pattern;
calculating means for calculating a corrected value dependent on said common value and a corresponding one of said received values;
an output coupled to said calculating means for outputting said corrected values; and
updating means for applying an update value dependent on said corrected value to the contents of said specified store locations.

28. A recognizing device according to claim 27 wherein said means for deriving determines said common value by taking the sum of the contents of the store locations specified by the contents of said input store.

29. A recognizing device according to claim 28 wherein said calculating means comprise means for obtaining said corrected value by subtracting an estimate value from a corresponding one of said received values and averaging means for deriving said estimate value from the average value of the contents of the store locations specified by the corresponding contents of said input store.

30. A recognizing device according to claim 28 wherein said calculating means comprises means for obtaining said corrected value by subtracting said sum from a corresponding one of said received values and said updating means comprises means for dividing said corrected value by the number of said addressable stores connected to said input store to provide said update value.

31. A recognizing device according to any one of claims 27 to 30 wherein said updating means adds said update value to the contents of each of said specified store locations.

32. A recognizing device according to any one of claims 27 to 30 further comprising means for selectively operating said device according to a predetermined sequence in either a recognition or an updating mode wherein in said recognition mode corrected values are output and in said update mode said updating means applies said update value to the contents of each of said addressable store locations.

33. A recognizing device according to any one of claims 27 to 30 wherein said input store comprise a shift register into which data forming a signal pattern to be recognized may be fed and said addressable stores having identical values written in locations corresponding to a plurality of positions of said signal pattern in said shift register such that said signal pattern may be subsequently recognized independently of its position in said input store.

34. A recognizing device according to any one of claims 27 to 30 including a transmitter/receiver unit wherein said transmitter output is also applied to said device input, said receiver is connected to said output for outputting corrected values and said means for receiving values is supplied with a signal to be received by said receiver, such that portions of said signal to be received by the receiver which are derived from signals transmitted by the transmitter are cancelled.

35. A recognizing device according to any one of claims 27 to 30 wherein said device input is coupled to a signal to be digitally filtered, and further including means for disabling said updating means after supplying the signal to be filtered to said device input, said device input also being connected to said means for receiving values.

* * * * *